United States Patent

Kagata et al.

Patent Number: 5,273,944
Date of Patent: Dec. 28, 1993

[54] DIELECTRIC CERAMIC COMPOSITION AND MULTILAYER MIRCOWAVE DEVICE EMPLOYING THE SAME

[75] Inventors: Hiroshi Kagata, Neyagawa; Tatsuya Inoue, Takatsuki; Junichi Kato, Osaka; Ichiro Kameyama, Takatsuki, all of Japan

[73] Assignee: Matsushita Electric Industrial Co., Ltd., Osaka, Japan

[21] Appl. No.: 14,505

[22] Filed: Feb. 8, 1993

[30] Foreign Application Priority Data

Feb. 14, 1992 [JP] Japan .................... 4-027775

[51] Int. Cl.$^5$ .................................... C04B 35/00
[52] U.S. Cl. ........................... 501/135; 501/134; 428/471
[58] Field of Search .............. 501/134, 135; 361/321; 428/471, 697

[56] References Cited

U.S. PATENT DOCUMENTS

| | | | |
|---|---|---|---|
| 3,847,829 | 11/1974 | Bouchard .................. | 501/126 |
| 3,997,457 | 12/1976 | Takahashi et al. ......... | 501/136 |
| 4,330,631 | 5/1982 | Kawashima et al. ....... | 501/139 |
| 4,638,401 | 1/1987 | Ling et al. ................. | 361/321 |
| 4,978,646 | 12/1990 | Bardhan et al. ........... | 501/135 |
| 5,004,713 | 4/1991 | Bardhan et al. ........... | 501/135 |

FOREIGN PATENT DOCUMENTS 2438910 2/1975 Fed. Rep. of Germany ...... 501/135

OTHER PUBLICATIONS

Japanese Journal of Applied Physics, Part 1, vol. 31, No. 9B, Sep. 1992, Kagata et al. "Low-Fire Bismuth-Based Dielectric Ceramics for Microwave Use", pp. 3152-3155.

Comptes Rendus des Seances de l'Academie des Sciences, vol. 271C, No. 14, Oct. 5, 1970, Paris, Brusset et al. "Synthese d'oxydes ternaires $CaB^{V}_{0.5}B^{III}_{0.5}O_3$", pp. 310-813.

Wakino et al., *Journal of the American Ceramic Society*, 67(4) 278-281 (1984).

*Primary Examiner*—Mark L. Bell
*Assistant Examiner*—Deborah Jones
*Attorney, Agent, or Firm*—Wenderoth, Lind & Ponack

[57] ABSTRACT

A dielectric ceramic composition which consists essentially of bismuth oxide, calcium oxide and niobium oxide, wherein when the dielectric ceramic composition is expressed by a formula $xBiO_{3/2}\text{-}yCaO\text{-}zNbO_{5/2}$ and the x, y and z are plotted in a ternary system diagram so as to total 1.0, the x, y and z fall in a region enclosed by a pentagon having the following vertexes A, B, C, D and E, A: (x, y, z) = (0.55, 0.16, 0.29)
B: (x, y, z) = (0.5, 0.21, 0.29)
C: (x, y, z) = (0.44, 0.24, 0.32)
D: (x, y, z) = (0.44, 0.2, 0.36) and
E: (x, y, z) = (0.5, 0.175, 0.325); and a multilayer microwave device including a dielectric layer formed by the dielectric ceramic composition.

4 Claims, 4 Drawing Sheets

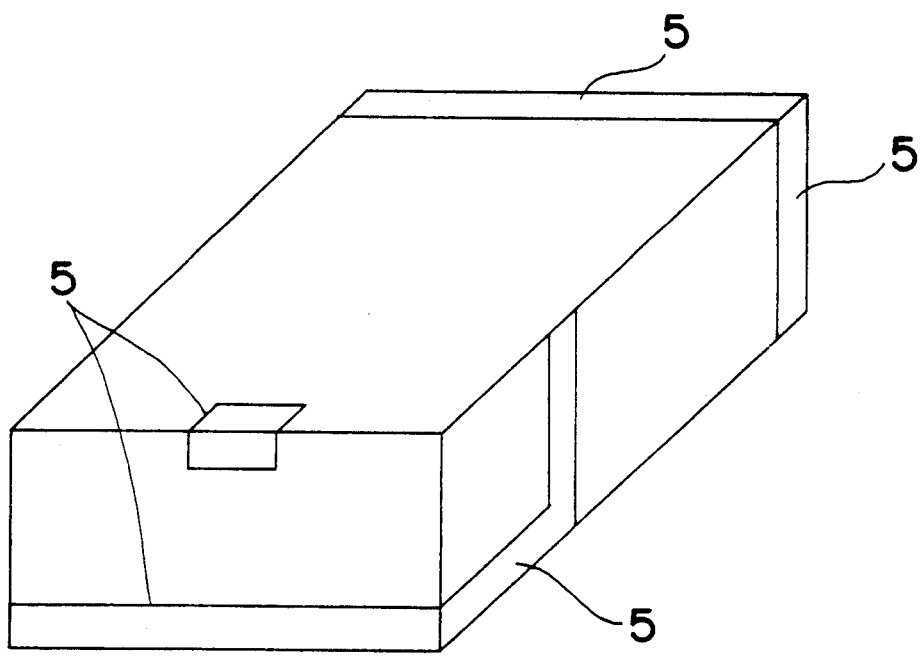

DIELECTRIC CERAMIC COMPOSITION AND MULTILAYER MIRCOWAVE DEVICE EMPLOYING THE SAME

BACKGROUND OF THE INVENTION

The present invention relates to a dielectric ceramic used in the microwave frequency region and a multilayer microwave device employing the dielectric ceramic.

In response to recent development of communications utilizing electromagnetic wave in the microwave frequency region, for example, a mobile phone, a portable phone and satellite broadcasting, there is a keen demand for compact equipments. To this end, each of components constituting each equipment should be made compact. In these equipments, dielectric material is incorporated, as a dielectric resonator, in a filter element or an oscillator element. In case an identical resonance mode is employed, size of the dielectric resonator is inversely proportional to square root of a dielectric constant of the dielectric material. Therefore, material having high dielectric constant is required for producing a compact dielectric resonator. In addition, in order to put a dielectric resonator to practical use, the dielectric loss should be low in the microwave frequency region, namely, the Q value should be high. Furthermore, change of resonant frequency with temperature should be small.

A number of ceramics for dielectric resonators have been developed so far. For example, U.S. Pat. No. 4,330,631 discloses $BaO\text{-}TiO_2\text{-}Sm_2O_3$ type ceramic as a ceramic having an especially high dielectric constant. This ceramic has a dielectic constant of about 80, a high Q value of about 3000 at 2 to 4 GHz and a small temperature coefficient of resonant frequency. Meanwhile, $BaO\text{-}PbO\text{-}TiO_2\text{-}Nd_2O_3$ type ceramic is reported as a ceramic having a dielectric constant of not less than 90 in Journal of American Ceramic Society, Vol. 67 (1984), p. 278-281.

Meanwhile, if conductive material and dielectric ceramic are of multilayer construction, the dielectric resonator can be made compact and have high functions. Conductive material for multilayer devices is required to have high conductivity for use at high frequency and therefore, should be Cu, Au, Ag or their alloy. On the other hand, dielectric ceramic for multilayer devices is required to be co-fired with the conductive metal and thus, should be fired under conditions in which the conductive metal is neither molten nor oxidized. Namely, dielectric material for multilayer devices should be sintered densely at low temperatures of not more than 1050° C. Furthermore, when Cu is used as the conductive metal, characteristics of dielectric material for multilayer devices should not deteriorate even in the case of firing at low partial pressure of oxygen.

However, known ceramics for microwave, including the above mentioned dielectric ceramic have a high firing temperature of about 1300° C. and thus, cannot be co-fired with the conductive metal having high conductivity, thereby resulting in failure in production of multilayer devices. Bi-based material is known as a dielectric ceramic suitable for low-temperature sintering. Especially, $Bi_2(ZnNb_2)O_6\text{-}Bi_3(Ni_2Nb)O_9$ disclosed in U.S. Pat. No. 4,638,401 is a dielectric material for a multilayer capacitor and can be sintered at about 950° C. Furthermore, this dielectric material has a high dielectric constant of 90 and excellent temperature characteristics of the dielectric constant. However, not to mention this dielectric material, no dielectric ceramic having high dielectric constant is known which can be used at high frequency of not less than 100 MHz and sintered at low temperatures.

SUMMARY OF THE INVENTION

Accordingly, an essential object of the present invention is to provide not only a dielectric ceramic composition which can be co-fired with Cu, Ag, Au or their alloy and has excellent characteristics in the microwave frequency region but a multilayer microwave device employing the dielectric ceramic.

In order to accomplish this object of the present invention, a dielectric ceramic composition according to the present invention consists essentially of bismuth oxide, calcium oxide and niobium oxide, wherein when the dielectric ceramic composition is expressed by a formula $xBiO_{3/2}\text{-}yCaO\text{-}zNbO_{5/2}$ and the x, y and z are plotted in a ternary system diagram so as to total 1.0, the x, y and z fall in a region enclosed by a pentagon having the following vertexes A, B, C, D and E, A: (x, y, z)=(0.55, 0.16, 0.29)
B: (x, y, z)=(0.5, 0.21, 0.29)
C: (x, y, z)=(0.44, 0.24, 0.32)
D: (x, y, z)=(0.44, 0.2, 0.36) and
E: (x, y, z)=(0.5, 0.175, 0.325).

Furthermore, by employing the dielectric ceramic composition as a dielectric layer, the present invention provides a multilayer device in which Cu, Ag, Au or their alloy is used as a conductor.

The above mentioned dielectric ceramic is sintered densely even in the case of firing in air or $N_2$ of not more than 1050° C. and under low partial pressure of oxygen, e.g in $N_2$ and exhibits in the microwave frequency region of 2 to 6 GHz, excellent characteristics such as a dielectric constant of not less than 50, a Q value of not less than 300 and an absolute value of temperature coefficient of resonant frequency of not more than 50 ppm/°C.

Furthermore, by using the above mentioned dielectric ceramic, it becomes possible to produce a multilayer device employing a metal having high conductivity, for example, Cu, Ag, Au or their alloy as conductive material.

BRIEF DESCRIPTION OF THE DRAWINGS

This object and features of the present invention will become apparent from the following description taken in conjunction with the preferred embodiments thereof with reference to the accompanying drawings, in which:

FIG. 4 is a perspective view of the multilayer dielectric resonator of FIG. 2.

Before the description of the present invention proceeds, it is to be noted that like parts are designated by like reference numerals throughout several views of the accompanying drawings.

DETAILED DESCRIPTION OF THE INVENTION

Figure 1:
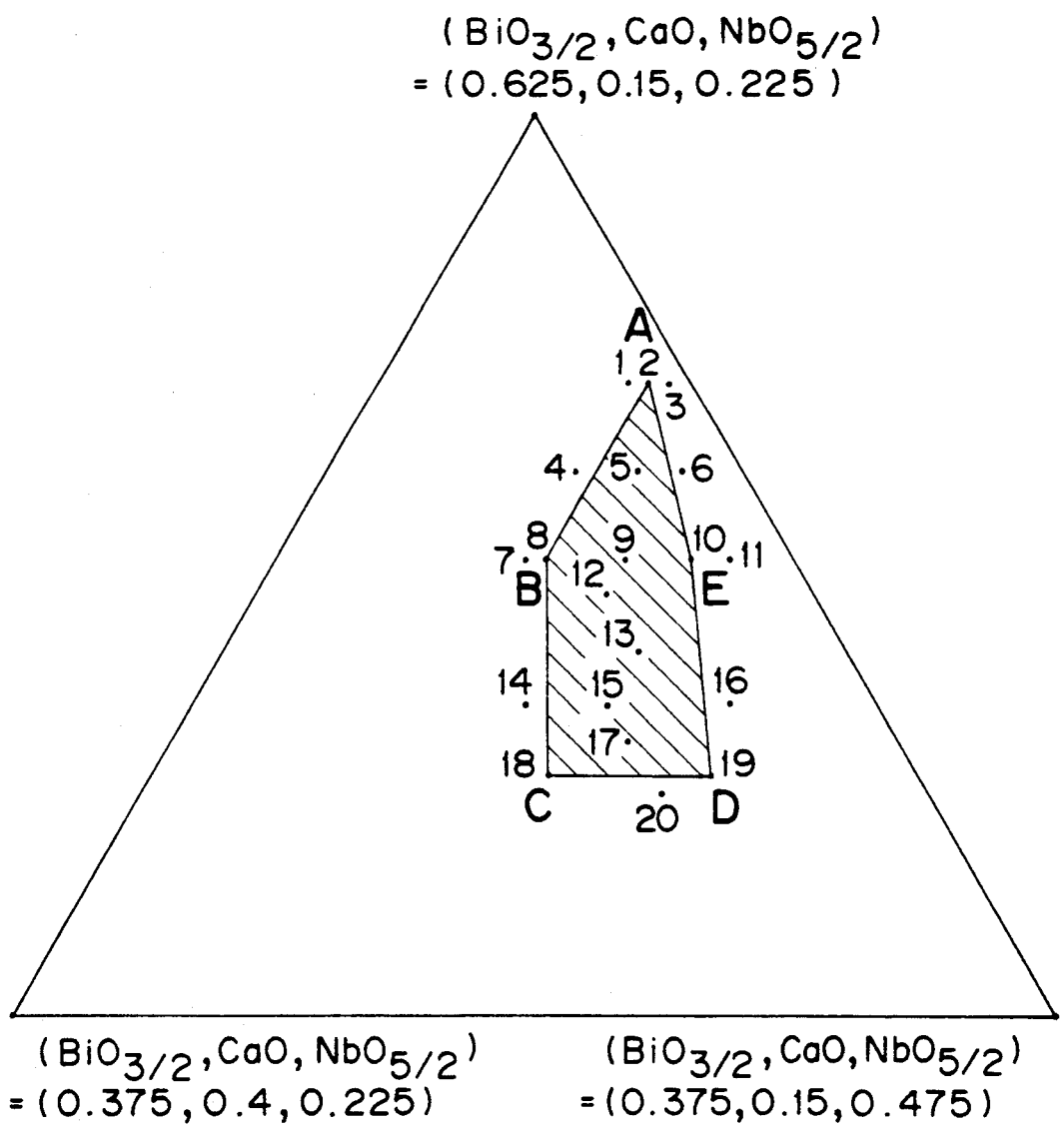
FIG. 1 is a diagram showing composition of a dielectric ceramic consisting of ternary system, according to the present invention.

In FIG. 1, the hatched pentagon A, B, C, D and E in an equilateral triangle shows composition of a dielectric ceramic composed of bismuth oxide, calcium oxide and niobium oxide, according to the present invention.

Initially, a first embodiment of the present invention is described. $Bi_2O_3$, $CaCO_3$ and $Nb_2O_5$ which are highly pure chemically are employed as starting materials for the dielectric ceramic and purity of each of the starting materials is corrected. Then, the starting materials are measured such that the dielectric ceramic has a composition expressed by a formula $xBiO_{3/2}$-$yCaO$-$zNbO_{5/2}$ where x, y and z assume values shown in Table 1 below so as to total 1.0, namely, $x+y+z=1.0$. Subsequently, powders of these starting materials are put into a ball mill made of polyethylene. Thereafter, stabilized zirconia balls and pure water are added to the powders and mixed with the powders for 17 hours. Then, the slurry is dried and put into a crucible made of alumina so as to be calcined at 800° C. for 2 hours. The calcined powder is ground by as same method as mixing and dried, so that raw material powder is obtained. Subsequently, 6% by weight of aqueous solution of polyvinyl alcohol having a concentration of 5% is mixed with the raw material powder as a binder and then, is passed through a sieve having a 32-mesh so as to be granulated. Then, the granulated powder is pressed into a cylinder of 13 mm in diameter and about 5 mm in thickness at 100 MPa. The pressed body is heated at 650° C. for 2 hours such that the binder is burned out. Then, after the body has been put into a vessel made of magnesia, a lid is placed on the vessel. The vessel is held in air at 850 to 1100° C. on 2 hours so as to fire the body. Dielectric characteristics are measured about the sintered body which is fired at a temperature giving a maximum density. Results are shown in Table 1 below.

In Table 1, sample Nos. having the symbol "#" denote comparative examples falling out of the scope of the present invention.

TABLE 1

| Sample No. | Composition | | | Firing temp. (°C.) | Di-electric constant | Q value | τf (ppm/°C.) |
|---|---|---|---|---|---|---|---|
| | x | y | z | | | | |
| 1# | 0.55 | 0.165 | 0.285 | 950 | 67 | 270 | +57 |
| 2 | 0.55 | 0.16 | 0.29 | 950 | 70 | 310 | +48 |
| 3# | 0.55 | 0.155 | 0.295 | 1000 | 72 | 250 | +40 |
| 4# | 0.525 | 0.19 | 0.285 | 925 | 59 | 260 | +41 |
| 5 | 0.525 | 0.175 | 0.30 | 950 | 66 | 340 | +41 |
| 6# | 0.525 | 0.165 | 0.31 | 975 | 72 | 280 | +33 |
| 7# | 0.5 | 0.215 | 0.285 | 925 | 55 | 220 | +20 |
| 8 | 0.5 | 0.21 | 0.29 | 950 | 57 | 320 | +21 |
| 9 | 0.5 | 0.19 | 0.31 | 975 | 65 | 480 | +29 |
| 10 | 0.5 | 0.175 | 0.325 | 1025 | 71 | 330 | +30 |
| 11# | 0.5 | 0.165 | 0.335 | 1075 | 81 | 110 | +5 |
| 12 | 0.49 | 0.2 | 0.31 | 975 | 60 | 590 | +26 |
| 13 | 0.475 | 0.2 | 0.325 | 1000 | 62 | 630 | +15 |
| 14# | 0.46 | 0.235 | 0.305 | 975 | 59 | 270 | +26 |
| 15 | 0.46 | 0.215 | 0.325 | 1000 | 58 | 930 | +21 |
| 16# | 0.46 | 0.185 | 0.355 | 1100 | 73 | 150 | −20 |
| 17 | 0.45 | 0.215 | 0.335 | 1025 | 58 | 460 | +16 |
| 18 | 0.44 | 0.24 | 0.32 | 1000 | 63 | 300 | +28 |
| 19 | 0.44 | 0.2 | 0.36 | 1025 | 70 | 310 | −15 |

TABLE 1-continued

| Sample No. | Composition | | | Firing temp. (°C.) | Di-electric constant | Q value | τf (ppm/°C.) |
|---|---|---|---|---|---|---|---|
| | x | y | z | | | | |
| 20# | 0.435 | 0.215 | 0.35 | 1025 | 68 | 270 | −19 |

In Table 1, the resonant frequency and the Q value are determined by dielectric resonator method. The dielectric constant is calculated from dimensions of the sintered body and the resonant frequency. The resonant frequency is 3 to 5 GHz. Meanwhile, by measuring the resonant frequency at −25° C., 20° C. and 85° C., temperature coefficient of resonant frequency $\tau_f$ is obtained by method of least squares as shown in Table 1.

As will be seen from Table 1, the dielectric ceramic of the present invention is sintered densely at a low temperature of not more than 1050° C. and exhibits a dielectric constant of not less than 50, a Q value of not less than 300 and a small absolute value of not more than 50 ppm/°C. of temperature coefficient of resonant frequency. Meanwhile, also in the case of firing in $N_2$, there is characteristics. The samples of the comparative examples have a Q value of not more than 300 and therefore, are not suitable for practical use.

Hereinbelow, a second embodiment of the present invention is described with reference to Table 2 below. In Table 2, sample Nos. having the symbol "#" denote comparative examples falling out of the scope of the present invention, while character c represents a value of $\{(Cu/(Bi+Ca+Nb))\}$. As shown in Table 2 below, two kinds of compositions are selected as main compositions of the dielectric ceramic and various amounts of CuO are added to the compositions as Cu components.

TABLE 2

| Sample No. | Composition | | | | Firing temp. (°C.) | Di-electric constant | Q value | τf (ppm/°C.) |
|---|---|---|---|---|---|---|---|---|
| | x | y | z | c | | | | |
| 1 | 0.49 | 0.20 | 0.31 | 0 | 975 | 60 | 590 | +26 |
| 2 | 0.49 | 0.20 | 0.31 | 0.01 | 925 | 61 | 580 | +23 |
| 3 | 0.49 | 0.20 | 0.31 | 0.04 | 900 | 59 | 370 | +21 |
| 4# | 0.49 | 0.20 | 0.31 | 0.05 | 900 | 57 | 190 | +20 |
| 5 | 0.45 | 0.215 | 0.335 | 0 | 1025 | 58 | 460 | +16 |
| 6 | 0.45 | 0.215 | 0.335 | 0.005 | 950 | 59 | 490 | +14 |
| 7 | 0.45 | 0.215 | 0.335 | 0.04 | 925 | 57 | 330 | +12 |
| 8# | 0.45 | 0.215 | 0.335 | 0.05 | 900 | 56 | 130 | +10 |

Preparation of the sintered body and evaluation of dielectric characteristics of the sintered body are performed in the same manner as in the first embodiment of the present invention.

It will be understood from Table 2 that addition of Cu in the samples of the present invention do not deteriorate microwave characteristics of the dielectric ceramic. On the other hand, addition of Cu in the samples of the comparative examples lowers the Q value in microwave characteristics of the dielectric ceramic. Consequently, it is desirable that the value c of $\{Cu/(Bi+Ca+Nb)\}$ is not more than 0.04, i.e., $\{Cu/(Bi+Ca+Nb)\} \leq 0.04$.

Figure 2:
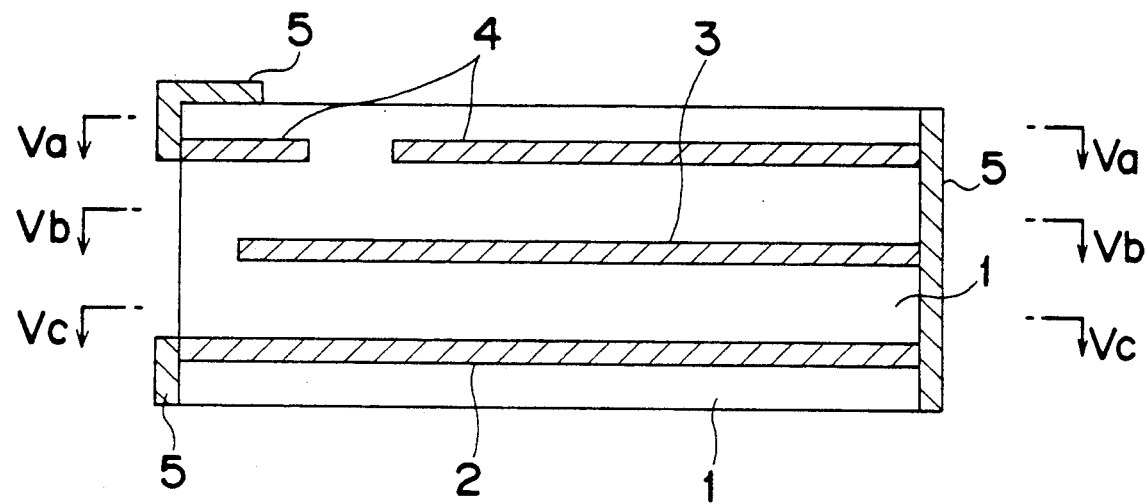
FIG. 2 is a longitudinal sectional view of a 10 multilayer dielectric resonator including the dielectric ceramic of FIG. 1.
Figure 3:
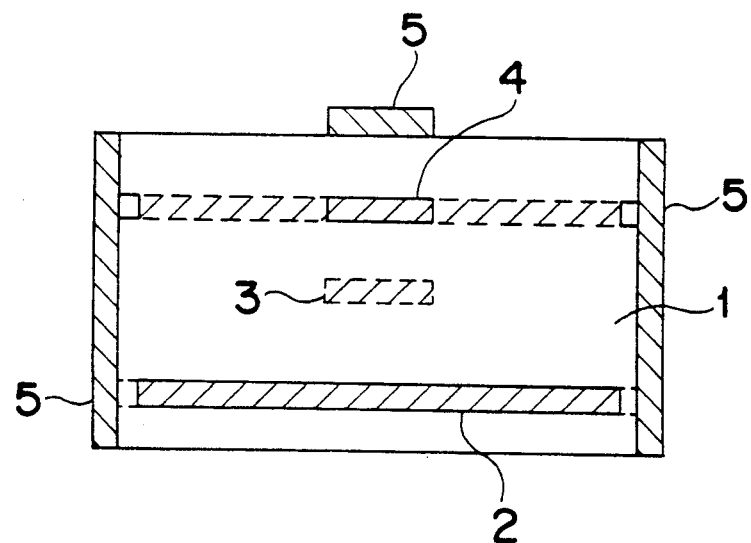
FIG. 3 is a transverse sectional view of the multilayer dielectric resonator of FIG. 2.

Furthermore, a third embodiment of the present invention is described with reference to FIGS. 2 to 4 showing a dielectric resonator. As a multilayer microwave device, the dielectric resonator includes a dielectric layer 1, inner conductive layers 2, 3 and 4 embedded in the dielectric layer 1 and an outer electrode 5. A capacitor for an input is formed between the inner conductive layers 3 and 4 so as to act as a built-in capacitor. The dielectric layer 1 is made of the dielectric ceramic according to the second embodiment of the present invention. Firstly, production of the dielectric resonator is described. Initially, calcined dielectric powder is prepared in which 0.1% by weight of CuO is added to the composition of the sample No. 12 of Table 1. Organic binder, solvent and plasticizer are added to and mixed with the calcined powder so as to obtain slurry. The slurry is formed into a sheet by doctor blade method. By selecting one from various metals shown in Table 3 below as a conductive metal, the metal is kneaded with vehicle so as to obtain paste.

TABLE 3

| Conductive metal | Resonant frequency (MHz) | Unloaded Q value |
|---|---|---|
| Cu | 855 | 170 |
| Ag | 850 | 190 |
| 99Ag—1Pt | 845 | 180 |
| 95Ag—5Pd | 845 | 170 |
| Au | 860 | 180 |

Figure 5A:
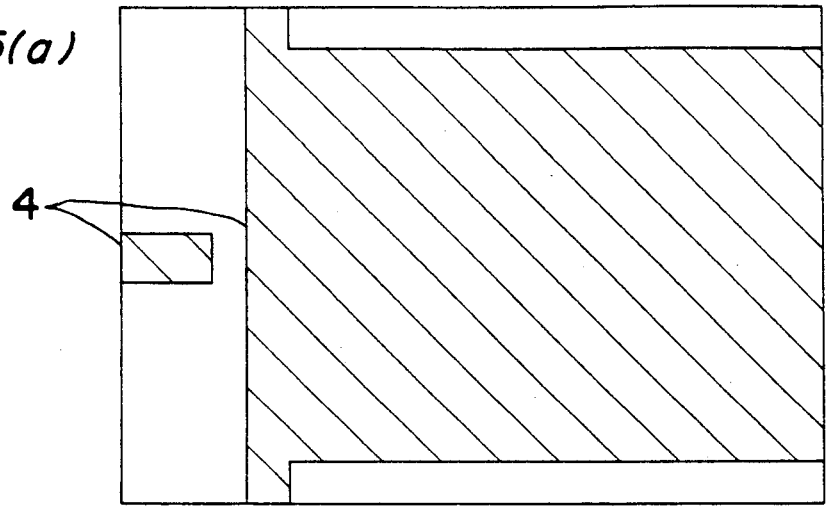
FIGS. 5(a) to 5(c) are diagrams showing printing patterns of inner conductive layers of the multilayer dielectric resonator of FIG. 2 as observed in the directions of the arrows Va, Vb and Vc in FIG. 2, respectively.
Figure 5B:
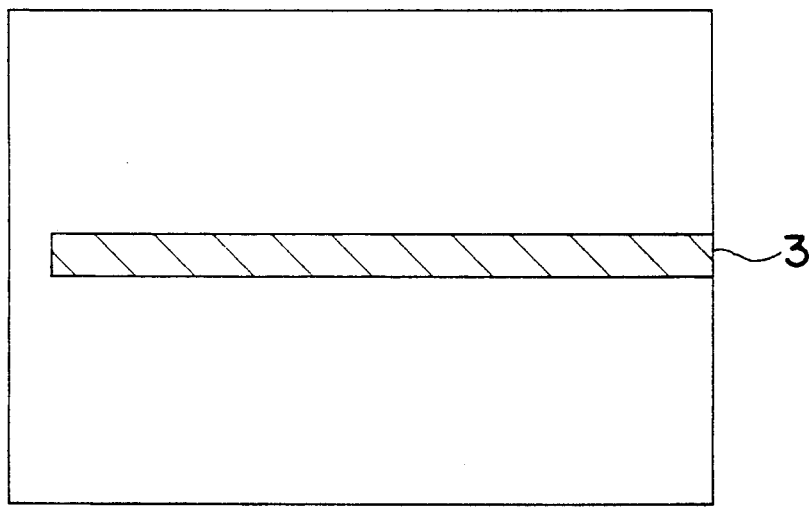
Figure 5C:
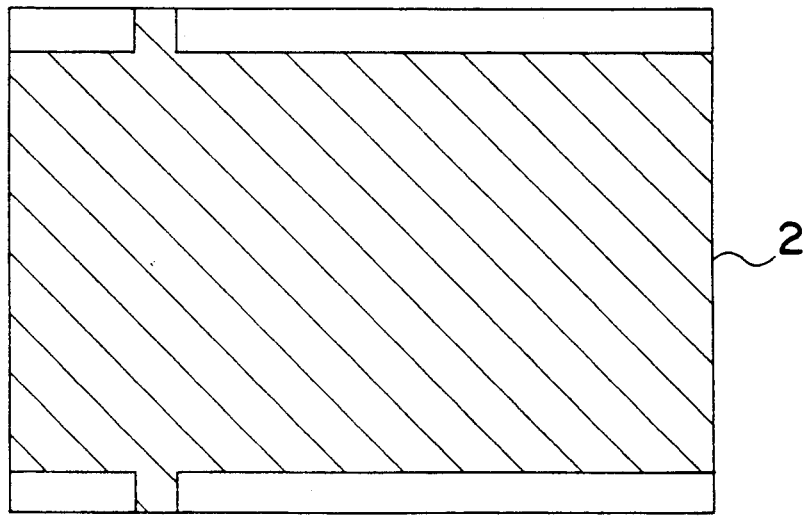

If the conductive metal is Cu, paste of CuO is employed. FIGS. 5(a) to 5(c) show printing patterns of the inner conductive layers 2, 3 and 4 of the dielectric resonator, respectively. In FIG. 5, the inner conductive layer 3 is set to a length of 13 mm. After a plurality of sheets have been laminated, the conductive pattern of the inner conductive layer 2 is formed by screen printing method. Moreover, after a plurality of sheets have been laminated thereon, the conductive pattern of the inner conductive layer 3 is printed. In addition, a plurality of sheets have been laminated on the inner conductive layer 3, a conductive pattern of the inner conductive layer 4 is printed. Subsequently, a plurality of sheets are laminated thereon and then, the lamination body is thermal pressed. After the product has been cut into individual chips, the chips are heat treated in air such that the binder is burned out. In case paste of CuO is employed, the chips are heat treated in $H_2$ so as to reduce the conductor to Cu and then, are fired in $N_2$. When other metals than CuO are used as the conductive metal, the chips are fired in air at 900° C. Then, commercially available paste of Cu is fired as the outer electrode 5 in air. As a result, a multilayer dielectric resonator is obtained. After firing, length of the inner conductive layer 3 ranges from 11.4 to 12.5 mm. For each of the conductive metals of Table 3, 10 chips are produced and dielectric characteristics are determined by using their average. Thus, resonant frequency and unloaded Q value of the dielectric resonator are obtained as shown in Table 3.

As shown in Table 3, since resonant frequency is 850 MHz or so and unloaded Q value is higher than 100 when any one of Cu, Au, Ag and their alloy is employed as the conductive metal, the dielectric resonator has excellent dielectric characteristics.

It is to be noted that dielectric constant of conventional low-temperature firing material for a substrate is about 8. Therefore, if a resonant frequency identical with that of the present invention should be obtained in the same construction as that of the third embodiment by using the conventional low-temperature firing material for a substrate, the inner conductive layer 3 needs to have a length of 31.5 mm. On the other hand, since dielectric constant of the dielectric material of the present invention is as high as 60, length of the inner conductive layer 3 is as short as 11.5 mm and thus, the dielectric resonator having a resonant frequency of 850 MHz can be made compact remarkably.

Meanwhile, if the inner conductive layer 3 is formed into a curved shape or a stepped shape, the dielectric resonator can also be made further compact. By combining a plurality of these inner conductive layers 3 with a capacitor, etc., a band-pass filter or the like can also be obtained.

What is claimed is:

1. A dielectric ceramic composition which consists essentially of bismuth oxide, calcium oxide and niobium oxide,
   wherein when the dielectric ceramic composition is expressed by a formula $xBiO_{3/2}$-$yCaO$-$zNbO_{5/2}$ and the x, y and z are plotted in a ternary system diagram so as to total 1.0, the x, y and z fall in a region enclosed by a pentagon having the following vertexes A, B, C, D and E,
   A: (x, y, z) = (0.55, 0.16, 0.29)
   B: (x, y, z) = (0.5, 0.21, 0.29)
   C: (x, y, z) = (0.44, 0.24, 0.32)
   D: (x, y, z) = (0.44, 0.2, 0.36) and
   E: (x, y, z) = (0.5, 0.175, 0.325).

2. A dielectric ceramic composition as claimed in claim 1, which contains copper so as to satisfy an equation $\{Cu/(Bi+Ca+Nb)\} \leq 0.04\}$.

3. A multilayer microwave device which includes a conductor and a dielectric layer and the conductor is at least partially made of one metal or an alloy selected from the group consisting of Cu, Ag and Au,
   the dielectric layer being at least partially formed by a dielectric ceramic composition consisting essentially of bismuth oxide, calcium oxide and niobium oxide,
   wherein when the dielectric ceramic composition is expressed by a formula $xBiO_{3/2}$-$yCaO$-$zNbO_{5/2}$ and the x, y and z are plotted in a ternary system diagram so as to total 1.0, the x, y and z fall in a region enclosed by a pentagon having the following vertexes A, B, C, D and E,
   A: (x, y, z) = (0.55, 0.16, 0.29)
   B: (x, y, z) = (0.5, 0.21, 0.29)
   C: (x, y, z) = (0.44, 0.24, 0.32)
   D: (x, y, z) = (0.44, 0.2, 0.36) and
   E: (x, y, z) = (0.5, 0.175, 0.325).

4. A multilayer microwave device as claimed in claim 3, wherein the dielectric ceramic composition contains copper so as to satisfy an equation $\{Cu/(Bi+Ca+Nb) \leq 0.04\}$.

* * * * *